United States Patent [19]

Haake

[11] 4,291,521
[45] Sep. 29, 1981

[54] HUSK SEPARATOR FOR CORN HARVESTER

[75] Inventor: Hinrich Haake, Ahrensburg, Fed. Rep. of Germany

[73] Assignee: Klockner-Humboldt-Deutz AG-Zweigniederlassurg FAHR, Gottmadingen, Fed. Rep. of Germany

[21] Appl. No.: 955,181

[22] Filed: Oct. 27, 1978

[30] Foreign Application Priority Data

Nov. 2, 1977 [DE] Fed. Rep. of Germany ....... 2748950

[51] Int. Cl.³ ............................................ A01D 14/02
[52] U.S. Cl. ........................................ 56/13.5; 56/60; 56/16.5; 130/5 R
[58] Field of Search ................................ 56/14.1–14.6, 56/60, 122–125, 13.5, 16.5; 130/5 R, 5 B, 5 G

[56] References Cited

U.S. PATENT DOCUMENTS

| 1,190,231 | 7/1916 | Halcomb | 56/116 |
| 2,210,821 | 8/1940 | Sharp | 130/5 R |
| 2,792,005 | 5/1957 | Lee | 130/5 G |
| 2,822,812 | 2/1958 | Edwards | 56/122 |
| 3,110,314 | 11/1963 | Roberts et al. | 130/5 B |

Primary Examiner—Robert A. Hafer
Attorney, Agent, or Firm—Karl F. Ross

[57] ABSTRACT

A husk separator for cleaning a mixture of corn ear fragments including pieces of corn cob, corn kernels, and pieces of corn husks includes a first generally planar comb having generally horizontal first tines positioned to support the fragments, and a second rotary comb having a central shaft and a plurality of generally radially extending second tines displaceable on rotation of the shaft between and past the first tines. This second comb is rotated with its tines passing through those of the first comb to separate husk pieces from the cob pieces away from the first comb. The husk pieces are then stripped off the second comb by a plurality of stripper elements located between the tines of the second comb and engageable with the husk pieces on rotation of this second rotary comb.

10 Claims, 7 Drawing Figures

HUSK SEPARATOR FOR CORN HARVESTER

FIELD OF INVENTION

The present invention relates to an apparatus for cleaning a mixture of corn-ear fragments. More particularly this invention concerns such an apparatus usable in the corn harvester described in commonly filed and copending application Ser. No. 955,150 filed Oct. 27, 1978.

BACKGROUND OF THE INVENTION

In order to make a high-quality low-fiber animal feed from corn, it is known to chop the ears of corn up and use them either directly as silage or directly as feed for livestock. In particular such fodder has been found ideally suited in the raising of pigs.

To produce a good quality product it is necessary to eliminate not only the cornstalks from the fodder but also the corn husks. Thus a good so-called corn-cob mix contains only pieces of corn cob and corn kernels.

The necessary threshing or chopping operation and separation of the corn husks is normally carried out by a device which is completely separate from the harvester. This device typically merely chops the entire ears of corn up into small pieces, and then it uses a blower to separate the chaff-like corn husks from the denser cob pieces and kernels. Such an arrangement has the considerable disadvantage that frequently a good deal of usable fodder is blown away with the corn husks. It is possible to adjust the force of the blower down to prevent such blowing-away, but this normally leads to the inclusion of an excessive quantity of the fibrous corn husks in the mixture.

OBJECTS OF THE INVENTION

It is therefore an object of the present invention to provide an improved apparatus for cleaning a mixture of corn-ear fragments.

Another is to provide such an apparatus which can be mounted directly in a corn harvester and which accurately separates the corn husks from the pieces of corn cob and corn kernels so that a very high-quality corn-cob mix is produced.

SUMMARY OF THE INVENTION

These objects are attained according to the instant invention in a cleaning apparatus basically comprising a flat first comb or rake having generally horizontal first tines positioned to support the fragments to be cleaned, and a second rotary comb having a central shaft and a plurality of generally radially extending second tines displaceable on rotation of the shaft between and past the first tines. The second rotary comb is rotated to separate husk pieces from the cob pieces and kernels and to displace the separated husk pieces away from the first comb. Furthermore means is provided for stripping the husk pieces off the second comb.

Thus the system according to the instant invention relies on a fast-acting mechanical separator that accurately picks up and carries away the husk pieces, which are typically of relatively large surface density, that is of relatively large surface area relative to their mass. The husk pieces lying on top of the first comb are forced through it and carried away by the second comb, whereas any corn kernels or cob pieces also lying on it will be forced through the first comb and will merely fall down into a collecting floor of the apparatus for recovery and use.

According to further features of this invention a blower is provided which directs a current of air backwardly through a riddle provided upstream of the separating mechanism and also through this separating mechanism. This blower acts in the manner known per se to separate the lighter chaff-like husk pieces from the denser corn kernels and cob pieces.

In accordance with further features of this invention the tines of the second rotary comb have inner ends secured to the shaft of the second comb along a helix thereon forming at least two full turns around this shaft. Thus these tines will move sequentially through the first comb for minimum momentary loading and best stripping effect. These tines may be curved backwardly somewhat in the direction of rotation or simply inclined backwardly. They may be made of rigid or somewhat bendable elastomeric material.

According to further features of this invention the stripper means includes a stack of identical plates each lying in a plane between two respective tines of the second rotary comb. Each of these plates has a curved sharpened edge whose center of curvature is offset of the shaft axis and behind the shaft axis from the first comb relative to the normal direction of travel of the second comb. Thus as the tines of the rotary comb move upwardly to either side of these plates any husk fragments caught by these tines will be stripped therefrom, being cut off if necessary, so that they can fall harmlessly behind the machine to the ground to be plowed in at the next season as mulch.

SPECIFIC DESCRIPTION

Figure 1:
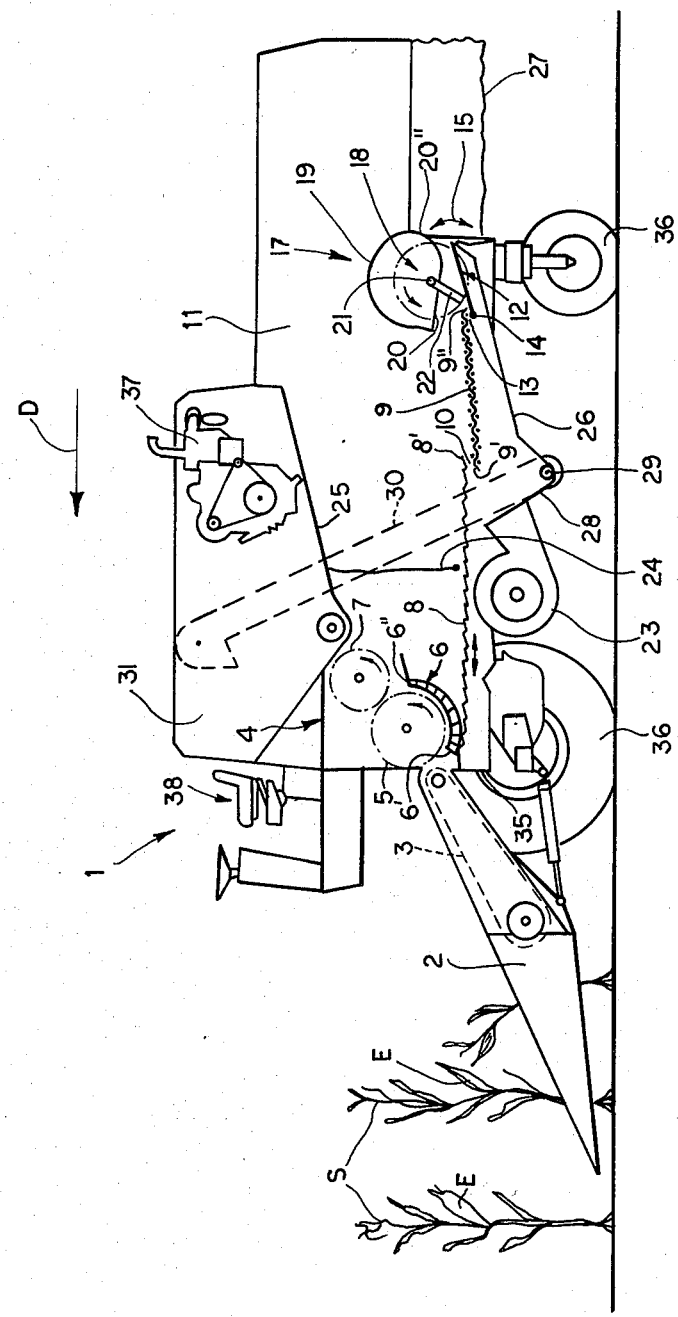
FIG. 1 is a largely schematic side view of the agricultural machine according to this invention.

As shown in FIG. 1 an agricultural machine 1 according to this invention has a chassis 35 supported by front and rear wheels 36 and adapted to travel along the ground in a direction D. An internal-combustion engine 37 is provided which operates all of the mechanism of this machine and which in turn is operated from an operator's station 38 on the top front of the machine relative to the direction D.

The machine has at its front end an intake 2 provided with a conveyor or stripper 3 adapted to separate ears E from stalks S of corn. Immediately behind this intake device 2 there is provided a threshing or chopping drum 5 rotated continuously about a horizontal axis and juxtaposed with a threshing concave or grid 6 spaced more closely to the drum 5 at its upstream end 6' than at its downstream end 6". Slightly above and behind this drum 5 is a stripping and deflecting drum 7. The drum 5 rotates at a peripheral speed of between 12 m/sec and 24 m/sec to reduce the ears E to fragments including pieces of cob, corn kernels, and pieces of husk. The drum 7 serves to deflect these fragments down onto a horizontally and transversely ridged floor 8 and also prevents the drum 5 from merely carrying these fragments around in its orbit.

The floor 8 is reciprocated horizontally with limited vertical movement in such a manner as to move the fragments received from the drum 5 backwardly opposite to the direction D. A curtain 24 hangs down from a floor 25 of a receptacle or bin 31 and extends transversely to the direction D from the floor 25 to a position immediately above the ridged floor 8. Thus material thrown back through the air by the drum 7 will strike this curtain 24 and fall down to the floor 8. As the fragments move backwardly on the floor 8 the lighter fragments will inherently rise to the surface.

The rear end 8' of the transversely ridged floor 8 is positioned behind the leading end 9' of a riddle 9, and spaced above this end 9' by a gap 10. An axial-input radial-output blower 23 is provided on the chassis underneath the floor 8 and has an output directed upwardly underneath the riddle 9 and through the gap 10. Thus as the fragments fall off the rear edge 8' and onto the riddle 9 the current of air coming through the gap 10 will project the lighter fragments, mainly pieces of husk, backwardly on the riddle 9. The smaller and denser fragments will pass through the riddle 9 and fall onto a floor 26 whence they can slide forwardly into a trough 28 provided with an auger 29 that leads to an elevator 30 that will displace these smaller and denser fragments upwardly into the receptacle 31.

The motor 37 gyrates the riddle 9 through a horizontally elongated circular stroke that displaces the fragments on it backwardly on this riddle 9 while agitating them so that, once again, the heavier and denser fragments fall through and onto the floor 26.

Figure 6:
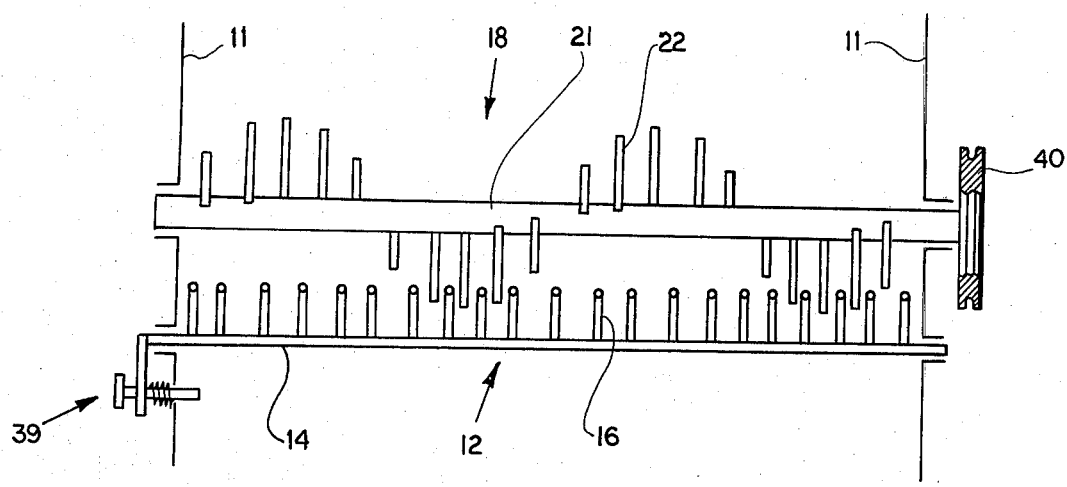
FIG. 6 is a large-scale top view of a detail of the machine of FIG. 1.
Figure 7:
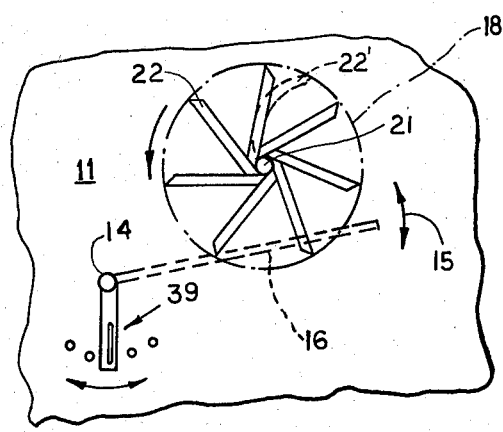
FIG. 7 is an end view of the structure shown in FIG. 6.

Located behind the rear edge 9" of the riddle 9 is a husk-separating arrangement 17 comprising basically a comb or rake 12, a rotor 18, and a housing 19. More particularly the rake 12 as shown in more detail in FIGS. 6 and 7 comprises a plurality of identical tines 16 lying in a common plane and all extending radially from a horizontal shaft or axle axle 14 journaled in the side walls 11 of the chassis 35 and adjustable pivotally as shown by arrow 15 (FIG. 1) by means of a mechanism 39 so that the angular position of these tines 16 can be varied.

The rotor 18 comprises a central shaft 21 from which extends a multiplicity of identical generally radially extending tines 22 of round or rectangular section extending in a helical array from a helix on the surface of the shaft 21 and forming effectively a two-turn screwthread formation thereon. The shaft 21 carries a V-belt 40 driven by the motor 37. The tines 22 are staggered relative to the tines 16 so that as the rotor 18 turns the tines 22 will pass between the tines 16, with the rotor 18 turning in a counterclockwise direction as seen in FIG. 1 so that its region adjacent the edge 9" is moving away from the riddle 9. The tines 22 are inclined somewhat backwardly in the normal direction of rotation of the rotor 18, or may be curved backwardly in the direction as shown at 22' in FIG. 7.

The housing 19 is formed of a row of parallel plates 20 each lying in a respective plane between a respective pair of tines and each having a curved edge 20' which has a center of curvature generally level with but behind the shaft 21. Thus as the rotor 18 turns, any fragments picked up by the tines 22 will be stripped off the rotor and will drop back onto a horizontal wind-protection screen 27. These edges 20' are preferably sharpened to actually cut adhering pieces loose to prevent the machine from jamming up. An adjustment drive similar to the drive mechanism 39 is provided for pivotally positioning the housing 19. By the time the fragments moving back along the riddle 9 reach the edge 9" the mass on the riddle 9 will consist mainly of relatively light husk fragments. The vigorous agitation of the riddle 9 will cause most of the small kernels and cob pieces to separate from the husk pieces and fall through the riddle 9. Nonetheless some cob pieces and kernels will still be mixed with the husk pieces and all of the remaining kernels will fall off the rear edge 9" through a horizontally extending and forwardly open gap 13 formed between this rear edge 9" and the rake 12.

Displacement of the husk pieces forwardly through the gap 13 and onto the floor 26 is possible as the blower 23 generates a current of air which passes backwardly through the gap 13 so that these light husk fragments will be urged backwardly by the current of air, but the heavier cob pieces and kernels will be able to move forwardly and fall between the tines 16. The rotor 18, which operates at a peripheral speed of 15 m/sec, therefore catches these husk pieces and forces them through and back along the comb 12. This rapid action automatically separates them from any remaining kernels of cob pieces and tosses these husk pieces backwardly onto the horizontal curtain screen 27. Thereafter the husk pieces, which are normally too fibrous for use as silage, are allowed to fall onto the field where they may be plowed under as mulch. The backwardly moving current of air from the blower 23 also passes through the combs 12 and 18 to aid in this chaff separation.

Figure 3:
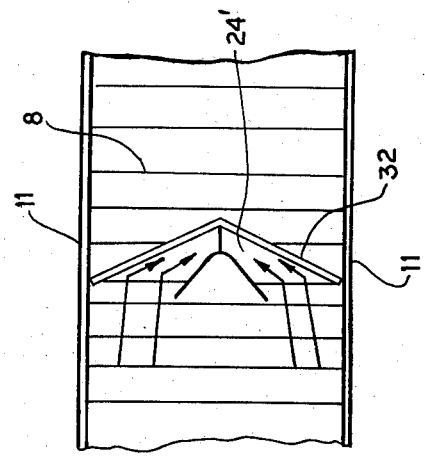
FIG. 3 is a section taken generally along line III—III of FIG. 2.
Figure 2:
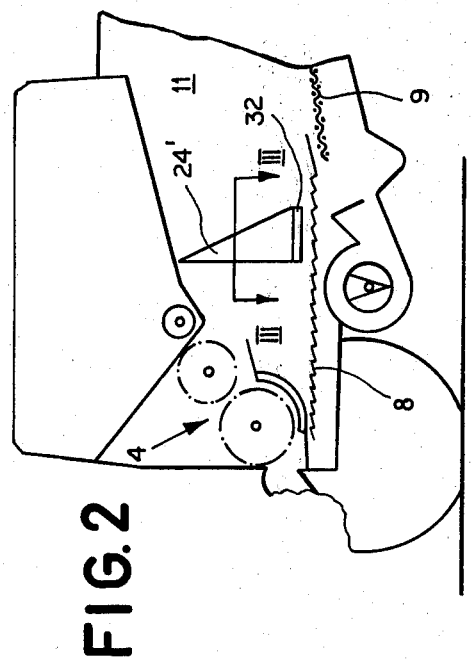
FIG. 2 is a large-scale and largely schematic view of a detail of FIG. 1.

FIGS. 2 and 3 show an arrangement wherein a curtain 24' substantially identical to the curtain 24 of FIG. 1 is provided at its lower end with a heavy metallic V-shaped stiffener 32 that points backwardly and is flared forwardly. Thus material tossed backwardly against the curtain 24' by the drums 5 and 7 will be deflected into the center of the ridged floor 8 for maximum efficiency and to prevent leakage of some of this material between the edges of the floor 8 and the sidewalls 11.

Figure 5:
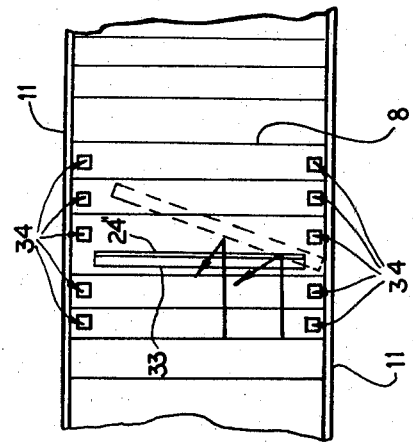
FIGS. 4 and 5 are views corresponding generally to FIGS. 2 and 3 but showing another arrangement according to this invention.
Figure 4:
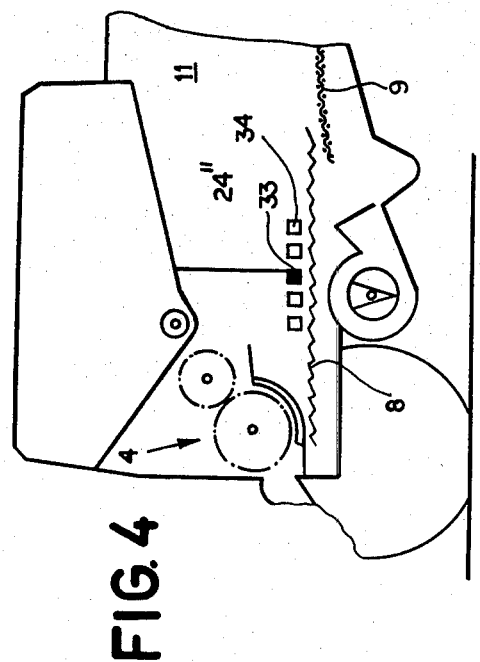

FIG. 4 shows an arrangement particularly useful when corn is being harvested on a slope. Here the curtain 24" is provided at its lower edge with a horizontally extending and straight stiffener bar 33. Each side wall 11 is provided with five horizontally spaced projections or stops 34. When harvesting on the level the bar 33 will be able to move limitedly forwardly and backwardly free of the stops 34. This is shown in solid lines in FIG. 5. When harvesting on a slope, however, the bar 33 will inherently tip towards one side wall 11 and will engage between two of the stops 34 on the downhill side as shown in dashed lines in FIG. 5. The force of the material striking the curtain 24" will inherently push the bar 33 and curtain 24" backwardly, but since the one side is held this will only move the other side back. Therefore a tendency of the crop to collect on one side of the floor 8 during hill harvesting is automatically countered by opposite tipping of the curtain 24" and opposite deflection of the fragments uphill.

I claim:
1. An apparatus for harvesting corn comprising:
a chassis adapted to travel along the ground;
means on the front of said chassis for picking ears off cornstalks;

means on said chassis for reducing said ears to fragments including pieces of corn cob, corn kernels, and pieces of corn husks and for displacing said fragments backwardly;

a first comb on said chassis having generally horizontal first tines positioned to support said fragments;

a second comb on said chassis having a central shaft and a plurality of generally radially extending second tines displaceable on rotation of said shaft between and past said first tines;

means on said chassis for rotating said second comb and thereby orbiting said second tines between and past said first tines to separate the husk pieces from the cob pieces and kernels and displace the separated husk pieces away from said first comb; and means on said chassis for stripping husk pieces off said second comb.

2. The apparatus defined in claim 1, further comprising blower means directed at said combs for directing a current of air backwardly through said combs and thereby aiding in the separation of the lighter husk pieces from the rest of said fragments.

3. The apparatus defined in claim 1 wherein said means for stripping includes a plurality of relatively nonrotatable elements each engageable between two respective tines of said second comb on rotation of same.

4. The apparatus defined in claim 3 wherein each of said elements has an edge with a center of curvature offset from said shaft and behind said first comb in the normal direction of rotation of said second comb.

5. The apparatus defined in claim 3 wherein said elements are displaceable relative to said second comb.

6. The apparatus defined in claim 1 wherein each of said second tines has an inner end secured to said shaft at a helix thereon, said tines thereby being angularly offset to one another.

7. The apparatus defined in claim 6 wherein said helix makes two full turns around said shaft.

8. The apparatus defined in claim 1 wherein said second tines are inclined backwardly in the normal direction of rotation of said shaft.

9. The apparatus defined in claim 1 wherein said second tines are curved.

10. The apparatus defined in claim 1, further comprising:

a riddle on said chassis ahead of said first comb and positioned to receive said fragments at least indirectly from the reducing means and having a rear edge spaced above said first comb; and means for displacing said riddle and for moving said fragments backwardly with a portion of the smaller and denser fragments falling through said riddle and the rest of said fragments falling across said gap into said first comb.

* * * * *